May 11, 1937. A. H. BUCKLEY 2,079,837
POWER OPERATED MECHANISM
Filed April 5, 1935
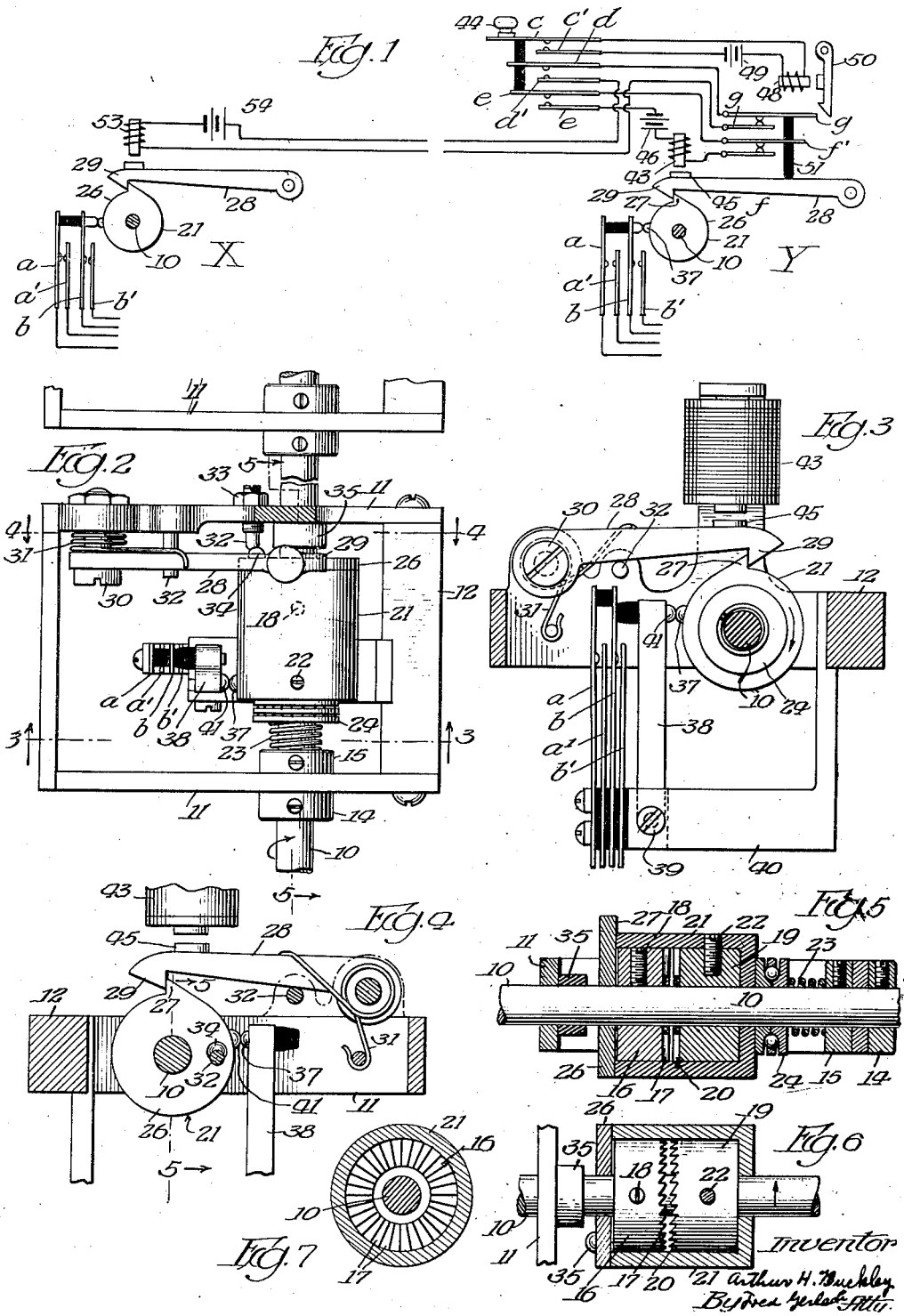

Patented May 11, 1937

2,079,837

UNITED STATES PATENT OFFICE 2,079,837

POWER OPERATED MECHANISM

Arthur H. Buckley, Chicago, Ill.

Application April 5, 1935, Serial No. 14,813

15 Claims. (Cl. 192—142)

The invention relates to mechanism for producing predetermined operations measured in exact relation to the rotary movement of a drive-shaft.

One object of the invention is to provide an improved mechanism for producing coordinated predetermined cycles of operations from independently driven shafts.

Another object of the invention is to provide improved means for producing coordinated predetermined cycles of movement or operations of make-and-break devices for electric circuits located at different stations.

Another object of the invention is to provide improved mechanism for producing predetermined operations of a device driven from a constantly driven shaft.

Another object of the invention is to provide improved circuit-controlling mechanism which is operated from, and measured in exact relation to the rotary movement of, a constantly driven power-shaft.

Other objects of the invention will appear from the detailed description.

The invention consists in the novel features which are hereinafter set forth and more particularly defined by claims at the conclusion hereof.

In the drawing: Fig. 1 is a diagram illustrating the invention applied to a transmission system. Fig. 2 is a plan view of a mechanism embodying the invention. Fig. 3 is a section taken on line 3—3 of Fig. 2. Fig. 4 is a section on line 4—4 of Fig. 3. Fig. 5 is a section taken on line 5—5 of Fig. 4. Fig. 6 is a section of the clutch members, the drum being shown in section. Fig. 7 is a detail of one of the clutch members.

The invention is exemplified with a power driven shaft 10 which is usually constantly driven, and at a suitable speed, for example, 300 revolutions per minute, from an electric motor or other source of power. Shaft 10 is mounted in, and extends through, a frame which comprises side-bars 11 and cross-bars 12 and 13 rigidly secured together. Collars 14 and 15 are secured to shaft 10 by means of suitable screws to retain the shaft against axial movement in the frame. Shaft 10 is adapted to operate one or a series of mechanisms hereinafter described, each through a clutch which is adapted to operate any predetermined cycle, for example, one revolution each time the clutch is engaged. The clutch comprises a drive-member 16 which is formed on one of its side faces with radial ratchet teeth 17 and is fixed by a screw 18 so it will rotate constantly with shaft 10 and a driven co-acting clutch-member 19 which is loose, and movable endwise, on the shaft and is provided with corresponding radial ratchet teeth 20 which are adapted to mesh with the teeth 17 to cause the member 19 to rotate with the shaft. A sleeve or drum 21 extends around, and encloses, both clutch-members 16, 19 and is secured by screw 22 to, and is axially movable with, driven clutch-member 19. A coil-spring 23 around shaft 10 is interposed between collar 15 and an anti-friction or ball bearing 24 to exert axial pressure upon the member 19 and the sleeve or drum 21 in one direction, so that when said sleeve and member 19 are free for axial movement on the shaft 10, the spring will force the teeth 20 of the clutch-member 19 into engagement with the teeth 17 of member 16.

A head or plate 26 is fixedly secured in any suitable manner to one end of the sleeve 21. A one-way stop-tooth 27 is formed on the periphery of plate 26 and is adapted to be engaged by a hook or stop-member 29 on a dog 28 which is pivotally mounted at 30 on one of the frame-sides 11 and is normally pressed by a spring 31 towards the sleeve 21 and plate 26. A stop-pin 31 limits the downward movement of dog 28 to avoid friction between the stop 29 and the periphery of plate 26. An electromagnet 43, controlled by means hereinafter described, is adapted to lift the dog 28 to release the sleeve 21 for rotative movement. This stop mechanism exemplifies a device for arresting the sleeve 21 in a predetermined rotative position after each predetermined cycle of movement of the sleeve by the clutch. A device is also provided for automatically and axially shifting the sleeve 21 and the clutch-member 19 fixed thereto at the end of each cycle of rotation to uncouple the clutch. This device comprises a stop-pin or abutment 32 which is adjustably fixed by a screw-thread and nut 33 in one of the frame-sides 11 and has its inner end rounded to operate as a cam, and a co-acting spherical cam-stud 34 which is fixed to the plate 26 and rotates with sleeve 21 and clutch member 19. When the dog 29 is lifted to release the stop-tooth 27, the spring 23 presses clutch-member 19, sleeve 21, and plate 26 axially in one direction to engage the teeth 20 with the teeth 17 on the constantly rotating clutch-member 16. At the end of each cycle, such as a complete revolution of the sleeve, the cam 34 will engage the inner end of fixed member 32 and the convex engaging surfaces of members 34 and 32 will force the sleeve, and the driven clutch member 19 carried thereby, axially in one direction against the force of spring 23 to disengage the driven clutch-member 19 from the constantly rotating clutch-member 16. The stop-tooth 27 is so positioned that the sleeve will be arrested after the spherical cam 34 passes beyond the center of the spherical end of member 32 and, as a result, axial pressure of spring 23 will be exerted on the stud 34 to cause the fixed member 32 to rotate stud 34 and the sleeve so the stop-tooth 27 will be firmly held against the stop 29 on dog 28. As a result, the sleeve and parts secured thereto, will be secured and positively and definitely stopped by the stop-teeth 27, 29 and the pressure of the spring 23 will be applied through the spherical surfaces on members 32, 34, to hold tooth 27 firmly against stop dog 28 and thus definitely position the sleeve in a desired predetermined position after the sleeve has been operated a cycle measured in exact relation to the rotary movement of the shaft 10. A collar 35 is interposed between plate 26 and one of the frame-sides 11 to limit the endwise movement of the sleeve 21. The construction thus far described exemplifies a device which is adapted to be driven from a constantly rotating power-shaft, and comprises clutch-members enclosed within a sleeve and means for automatically stopping the sleeve at the end of a predetermined cycle or one complete revolution.

The sleeve 21 is used to produce, or control the performance of, an operation such as shifting one or more electrical switches. For this purpose, the periphery of the sleeve is provided with a stud or cam 37 for shifting an arm 38 which is pivoted at 39 in a support 40 which is fixed to the frame-bar 12. Arm 38 is provided with a spherical stud 41 adapted to be engaged by the cam 37 on the sleeve 21 while the sleeve is stationary. Arm 39 is adapted to shift a pair of spring-contacts $a$ and $b$ to disconnect them from associated contacts $a'$ and $b'$, respectively. Normally, while the sleeve 21 is secured against rotation by dog 28, the cam stud 37 will engage arm 39 to hold the contacts $a$ and $b$ separated from contacts $a'$ and $b'$, respectively, to hold open the electrical circuits controlled thereby. When the dog 28 is released and the sleeve is shifted axially by the spring 23 to bring clutch-member 19 into engagement with the constantly rotating clutch-member 16, the sleeve will immediately commence to rotate, whereupon the cam-stud 37 will release arm 38 and permit contacts $a$ and $b$ to spring into engagement with contacts $a'$ and $b'$, respectively, to close the circuits controlled by said switches. The switches will remain closed during the entire cycle of operation of the sleeve 21 and until the dog 29 arrests the sleeve at the end of the predetermined cycle. This construction exemplifies mechanism for operating a cam in predetermined cycles from a constantly operating power-shaft through a sleeve or drum which is locked or stopped at the end of predetermined intervals or cycles in exact relation to the rotary movement of the power-shaft.

The shaft 10 may extend through any number of similar clutching and stopping mechanisms to selectively produce different operations or operate different circuits. Since this involves merely duplication, only one of these mechanisms is illustrated. The invention may also be used to coordinate operations of actuating mechanisms operated by independent drive-shafts 10, for example, when located at transmitting and receiving stations.

In Fig. 1, the invention is illustrated with one of the actuating mechanisms located at the transmitting station and a similar mechanism at the transmitting station Y and receiving station X for coordinating rotary movement or operations of instruments at both stations. The stop device 27, 28 of the actuating mechanism at the transmitting station is released by an electromagnet 43 and the similar stop-device for the actuating mechanism at the receiving station is controlled by an electromagnet 53. These magnets are conjointly controlled to transmit releasing impulses from the transmitting station to the receiving station to cause both actuating mechanisms to be coordinately operated and the operations measured in exact relation to the rotary movement of the drive-shafts.

Electromagnet 43 at the transmitting station is adapted to lift the dog 28 to release the sleeve 21 through selective control of a key 44. An armature 45 is fixed to dog 28 so that when the helix of magnet 43 is energized said dog will be lifted to release the associated sleeve 21 and cause the engagement of the clutch members to operate the switches at the transmitting station during the desired cycle. The key 44 is adapted to shift spring-switch members $c$, $d$ and $e$, which are normally separated from contacts $c'$, $d'$, and $e'$, respectively. Switch members $e$, $e'$ control a circuit through the helix of magnet 43, a normally closed switch $f$, $f'$, and a battery 46. Contacts $f$, $f'$ are closed while the sleeve 21 is stationary and are opened by the upward movement of dog 28 when it is lifted by the magnet 43 to interrupt the circuit through said magnet to render the dog operative to arrest sleeve 21 immediately after the initial rotation of the sleeve. For this purpose, dog 28 engages and lifts switch-member $f'$. In order to render the dog 28 inoperative by the magnet 43 until the cycle of operation of the sleeve 21 and the mechanisms controlled or operated thereby has been completed, the key 44 controls a circuit for holding the switch $f'$, $f$ open. Means for this purpose comprises switch contacts $c$, $c'$ at the key 44, a magnet 48 connected to said contacts and a battery 49 and a hook 50 which is operated by said magnet and is adapted to hold switch contact $f'$ disengaged from contact $f$. A switch comprising contacts $g$, $g'$ is normally closed and is controlled conjointly with the switch $f'$, $f$, switch members $g$ and $g'$ being secured together by a block 51 for simultaneous movement by the dog 28. Contacts $g$, $g'$ are normally closed to cause a transmitting signal or impulse to be transmitted to the receiving station X. When the dog 28 is lifted by the initial impulse of key-controlled magnet 43, switch contact $g$ will be separated from contact $g'$ and lifted into engagement with the hook 50.

The depression of the key 44 will momentarily close a circuit to lift dog 28 and release the sleeve 21 to cause it to be coupled to and driven by the power-shaft 10 at the transmitting station; a transmitting signal will be sent through a circuit controlled by switch $g$, $g'$; and a circuit will be closed to hold the hook 50 to hold switch contacts $g$, $f'$ open until the key 44 is released. As a result, the dog 28 at the station Y for arresting the sleeve 21 at the end of a predetermined rotative cycle, will be operative to arrest the sleeve at the end of the cycle, even though the key 44 be kept depressed by the operator, so that the cycle of operation will be predetermined regardless of the duration of the period which the key 44 is kept depressed.

The actuating mechanism at the receiving station X is controlled to produce a predetermined cycle of operation from its power-shaft 10 in coordination with the cycle of operation of the mechanism operated by the power-shaft 10 at the transmitting station. For this purpose, receiving station X is provided with a power-shaft 10, a sleeve 21 containing the clutch, and stop-mechanism including a dog 28 and members 32, 34, as previously described, so that upon each release of the sleeve by the dog 29 a coordinated or synchronized operation may be produced at the receiving station. The dog 28 at the receiving station is adapted to be lifted by an electromagnet 53 which is included in the circuit which includes normally open key-contacts d, d' and normally closed contacts g, g' at the transmitting station and a battery 54. When the key 44 is depressed at the transmitting station, an impulse will be sent through said circuit and magnet 53 to release the dog 28 at the receiving station, simultaneously with the release of the dog 28 at the transmitting station. As a result, a coordinated operation or cycle will be performed by the sleeve 21 to operate an instrument from the power-shaft 10 at the receiving station and at the transmitting station. The cam 37 on the sleeve 21 at the receiving station may operate the desired switches.

The clutch-driven sleeves 21 may be used to perform coordinated operations through single, or a series of, switches or the cam-stud 37 may be used to mechanically operate elements such as devices used in transmission systems.

The construction illustrated is adapted for co-ordinating the actuation of electrically-controlled mechanical devices in line telegraph systems and in stations of such a system for producing operations for predetermined periods.

The invention exemplifies means adapted to selectively and instantly release a rotatable cam to produce predetermined intervals, measured in exact relation to the rotary movement of a power-shaft, with positive means for releasing the driven parts at the end of the predetermined cycle and also a system in which the cycles from power-shafts at different stations can be definitely coordinated and synchronized to perform similar or different work.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In mechanism for producing operations for predetermined periods, the combination of a power-shaft, a clutch comprising rotatable drive and driven members, spring-means for coupling the clutch, positively-acting means for stopping the driven member at predetermined intervals, measured in exact relation to the rotary movement of the shaft, comprising a movable stop member and a coacting member rotating with the driven clutch member, and a key for controlling the stop means and rendering the driven member operative, electrically connected to shift the shiftable stop member momentarily, and then release it so it is movable independently of the key.

2. In mechanism for producing operations for predetermined periods, the combination of a power-shaft, a clutch comprising rotatable drive and driven members, positively-acting means for stopping the driven member at predetermined intervals, measured in exact relation to the rotary movement of the shaft, comprising a movable stop member and a coacting stop member rotatable with the driven clutch member, and means for releasing the stop means and rendering the driven member operative comprising a key and means for shifting the shiftable stop-member momentarily and then releasing it to render it operative independently of the position of the key.

3. In mechanism for producing operations for predetermined periods, the combination of a power-shaft, a clutch comprising rotatable drive and driven members, positively-acting means for stopping the driven member at predetermined intervals, measured in exact relation to the rotary movement of the shaft, comprising a movable stop-member and a coacting stop-member rotatable with the driven clutch member, and means for releasing the stop-means and rendering the driven member operative comprising a key, electromagnetic means for shifting the shiftable stop-member momentarily and means for releasing the shiftable stop-member to render it operative independently of the position of the key.

4. In mechanism for producing operations for predetermined periods, the combination of a power-shaft, a clutch comprising rotatable drive and driven members, spring-means for coupling the clutch members, positively-acting means for stopping the driven member at predetermined intervals, measured in exact relation to the rotary movement of the shaft, comprising a movable stop-member and a coacting member rotating with the driven clutch-member, and means for releasing the stop-means and rendering the driven member operative comprising a key and electromagnetic means for releasing the shiftable stop-member momentarily and releasing it to render it operative independently of the key.

5. In power-operated mechanism, the combination of a power shaft, a clutch on the shaft comprising a driving member and a driven member having teeth on their contiguous side faces, one of which is axially movable on the shaft, stop means comprising an element rotatable with the driven member and a releasable element, means for axially and rotatively shifting the driven member when the stop means is released to couple the clutch members, and actuating means rotated by the driven member.

6. In power-operated mechanism, the combination of a power shaft, a clutch on the shaft comprising a driving member and a driven member having teeth on their contiguous side faces, one of which is axially movable on the shaft, stop means comprising an element rotatable with the driven member and a releasable element, spring-actuated means for axially and rotatively shifting the driven member when the stop means is released to couple the clutch members, and actuating means rotated by the driven member.

7. In power-operated mechanism, the combination of a power shaft, a clutch on the shaft comprising a driving member and a driven member having teeth on their contiguous side faces, one of which is axially movable on the shaft, stop means comprising an element rotatable with the driven member and a releasable element, means comprising a spring and coacting cam members for axially and rotatively shifting the driven member when the stop means is released to couple the clutch members, and actuating means rotated by the driven member.

8. In power operated mechanism, the combination of a power shaft, a clutch comprising a driven member fixed to the shaft and a driving member axially movable on the shaft, said members having coacting teeth on their contiguous side faces, stop means for arresting the driven member against rotation at the end of a predetermined cycle of movement, means for shifting the axially movable clutch member comprising a spring applied to press the clutch members together, a cam rotatable with the driven member and a positively fixed stop adapted to engage the cam and whereby the driven member will be rotatively shifted as the spring shifts the driven member axially to couple it to the drive member, and actuating means rotated by the driven member.

9. In power-operated mechanism, the combination of a power shaft, a clutch comprising a driven member fixed to the shaft and a driving member axially movable on the shaft, said members having coacting teeth on their contiguous side faces, stop means for arresting the driven member against rotation at the end of a predetermined cycle of movement, means for shifting the axially movable clutch member comprising a spring applied to press the clutch members together, a cam rotatable with the driven member and a positively fixed cam adapted to engage the rotatable cam and whereby the driven member will be rotatively shifted as the spring shifts the driven member axially to couple it to the drive member, and actuating means rotated by the driven member.

10. In power-operated mechanism, the combination of a power shaft, a clutch comprising a driven member fixed to the shaft and a driving member axially movable on the shaft, said members having coacting teeth on their contiguous side faces, stop means comprising a disk rotatable with the driving member and a coacting releasable element for arresting the driven member against rotation at the end of a predetermined cycle of movement, means for shifting the axially movable clutch member comprising a spring applied to press the clutch members together, a cam on the disk and a positively fixed stop adapted to engage the cam and whereby the disk and driven member will be rotatively shifted as the spring shifts the driven member axially to couple it to the drive member, and actuating means rotated by the driven member.

11. In power-operated mechanism, the combination of a power shaft, a clutch comprising a driving member fixed to the shaft and a driven member axially movable on the shaft, said members having coacting teeth on their contiguous side faces, a sleeve on the shaft secured to the axially movable member and comprising a cylindrical wall extending around both of the clutch members and closed ends, stop means for arresting the sleeve against rotation at the end of a predetermined cycle of movement comprising an element on one end of the sleeve and a coacting releasable element, means for shifting the sleeve axially on the shaft to couple and uncouple the clutch members and actuating means on the sleeve.

12. In power-operated mechanism, the combination of a power shaft, a clutch comprising a driving member fixed to the shaft and a driven member axially movable on the shaft, said members having coacting teeth on their contiguous side faces, a sleeve on the shaft secured to the axially movable member and comprising a cylindrical wall extending around both of the clutch members, an integral end-wall and a disk, stop means for arresting the sleeve against rotation at the end of a predetermined cycle of movement comprising an element on the disk and a coacting releasable element, means for shifting the sleeve axially on the shaft to couple and uncouple the clutch members and actuating means on the sleeve.

13. In power-operated mechanism, the combination of a power shaft, a clutch comprising a driving member fixed to the shaft and a driven member axially movable on the shaft, said members having coacting teeth on their contiguous side faces, a sleeve on the shaft secured to the axially movable member and comprising a cylindrical wall extending around both of the clutch members, an integral end-wall and a disk, stop means for arresting the sleeve against rotation at the end of a predetermined cycle of movement comprising an element on the disk and a coacting releasable element, means for shifting the sleeve axially on the shaft to couple and uncouple the clutch members, comprising a cam on the disk and a fixed stop, and actuating means on the sleeve.

14. In power-operated mechanism, the combination of a power shaft, a clutch comprising a driving member fixed to the shaft and a driven member axially movable on the shaft, said members having coacting teeth on their contiguous side faces, a sleeve on the shaft secured to the axially movable member and comprising a cylindrical wall extending around both of the clutch members, an integral end-wall and a disk, stop means for arresting the sleeve against rotation at the end of a predetermined cycle of movement comprising an element on the disk and a coacting releasable element, means for shifting the sleeve axially on the shaft to couple and uncouple the clutch members, comprising a spring around the shaft, a cam on the disk and a fixed stop, and actuating means on the sleeve.

15. In power-operated mechanism, the combination of a power shaft, a clutch comprising a driving member fixed to the shaft and a driven member axially movable on the shaft, said members having teeth on their contiguous side faces, a cylindrical sleeve on the shaft secured to the axially movable member and extending around and enclosing the driving member, releasable stop means comprising an element rotatable with the sleeve and a releasable element for arresting the sleeve against rotation at the end of a predetermined cycle of movement, spring means for shifting the sleeve and driven member axially in one direction, cam means for shifting the sleeve against the force of the spring means comprising a member rotatable with the sleeve and a positively acting stationary member, and actuating means on the sleeve.

ARTHUR H. BUCKLEY.